(12) United States Patent
Brooks et al.

(10) Patent No.: US 9,009,117 B2
(45) Date of Patent: *Apr. 14, 2015

(54) SYSTEM, METHOD AND COMPUTER PROGRAM PRODUCT FOR VALIDATING ONE OR MORE METADATA OBJECTS

(75) Inventors: David Brooks, San Jose, CA (US); Lewis Wiley Tucker, San Francisco, CA (US); Benji Jasik, San Francisco, CA (US); Timothy Mason, San Francisco, CA (US); Eric David Bezar, Oakland, CA (US); Simon Wong, San Carlos, CA (US); Douglas Chasman, Pittsford, NY (US); Tien Tzuo, San Francisco, CA (US); Scott Hansma, San Francisco, CA (US); Adam Gross, San Francisco, CA (US); Steven Tamm, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/485,797

(22) Filed: May 31, 2012

(65) Prior Publication Data
US 2012/0239629 A1 Sep. 20, 2012

Related U.S. Application Data

(63) Continuation of application No. 13/315,237, filed on Dec. 8, 2011, now abandoned, which is a continuation of application No. 13/016,949, filed on Jan. 28, 2011, now Pat. No. 8,799,233, which is a continuation of (Continued)

(51) Int. Cl.
G06F 7/00 (2006.01)
G06F 17/30 (2006.01)
(Continued)

(52) U.S. Cl.
CPC ............ G06F 17/30017 (2013.01); G06F 8/68 (2013.01); G06F 17/30575 (2013.01); G06F 17/30893 (2013.01); G06F 8/60 (2013.01)

(58) Field of Classification Search
USPC ........................................................ 709/217
See application file for complete search history.

(56) References Cited

U.S. PATENT DOCUMENTS 5,987,471 A 11/1999 Bodine et al.
6,085,191 A 7/2000 Fisher et al.
(Continued)

OTHER PUBLICATIONS

Final Office Action from U.S. Appl. No. 13/016,949, dated Dec. 20, 2012.
(Continued)

*Primary Examiner* — Tony Mahmoudi
*Assistant Examiner* — Tuan-Khanh Phan
(74) *Attorney, Agent, or Firm* — Haynes Beffel & Wolfeld LLP; Ernest J. Beffel, Jr.

(57) ABSTRACT

In accordance with embodiments, there are provided mechanisms and methods for creating, exporting, viewing and testing, and importing custom applications in a multitenant database environment. These mechanisms and methods can enable embodiments to provide a vehicle for sharing applications across organizational boundaries. The ability to share applications across organizational boundaries can enable tenants in a multi-tenant database system, for example, to easily and efficiently import and export, and thus share, applications with other tenants in the multi-tenant environment.

15 Claims, 9 Drawing Sheets

Related U.S. Application Data application No. 11/530,394, filed on Sep. 8, 2006, now Pat. No. 7,949,684.

(60) Provisional application No. 60/715,749, filed on Sep. 9, 2005.

(51) Int. Cl.
*G06F 9/44* (2006.01)
*G06F 9/445* (2006.01)

(56) References Cited

U.S. PATENT DOCUMENTS

| | | | |
|---|---|---|---|
| 6,587,854 B1 | 7/2003 | Guthrie et al. | |
| 6,732,100 B1 | 5/2004 | Brodersen et al. | |
| 7,698,160 B2 | 4/2010 | Beaven et al. | |
| 8,024,128 B2 | 9/2011 | Rabinowitz et al. | |
| 8,065,178 B2 | 11/2011 | Lloyd et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,244,759 B2 | 8/2012 | Brooks et al. | |
| 8,275,836 B2 | 9/2012 | Beaven et al. | |
| 8,499,005 B2 | 7/2013 | Brooks et al. | |
| 2002/0095454 A1 | 7/2002 | Reed et al. | |
| 2003/0182656 A1* | 9/2003 | Leathers et al. | 717/177 |
| 2004/0133876 A1 | 7/2004 | Sproule | |
| 2004/0139075 A1 | 7/2004 | Brodersen et al. | |
| 2005/0065925 A1 | 3/2005 | Weissman et al. | |
| 2005/0072940 A1 | 4/2005 | Beloussov et al. | |
| 2005/0091185 A1 | 4/2005 | Koutyrine et al. | |
| 2005/0125353 A1 | 6/2005 | Schlesinger et al. | |
| 2005/0125438 A1* | 6/2005 | Krishnaswamy et al. | 707/102 |
| 2005/0132207 A1 | 6/2005 | Mourad | |
| 2005/0165639 A1 | 7/2005 | Ross et al. | |
| 2005/0240569 A1 | 10/2005 | Cheng et al. | |
| 2006/0100912 A1 | 5/2006 | Kumar et al. | |
| 2006/0136748 A1 | 6/2006 | Bade et al. | |
| 2006/0173894 A1 | 8/2006 | Kristoffersen et al. | |
| 2006/0253849 A1 | 11/2006 | Avram et al. | |
| 2006/0282482 A1* | 12/2006 | Castro et al. | 707/204 |
| 2006/0294051 A1* | 12/2006 | Kapadia et al. | 707/1 |
| 2007/0180432 A1* | 8/2007 | Gassner et al. | 717/136 |
| 2007/0198320 A1 | 8/2007 | Lloyd et al. | |
| 2011/0202508 A1 | 8/2011 | Brooks et al. | |
| 2011/0202911 A1 | 8/2011 | Brooks et al. | |
| 2012/0054241 A1 | 3/2012 | Brooks et al. | |
| 2012/0054328 A1 | 3/2012 | Brooks et al. | |
| 2012/0059807 A1 | 3/2012 | Brooks et al. | |
| 2012/0059862 A1 | 3/2012 | Brooks et al. | |
| 2012/0084266 A1 | 4/2012 | Brooks et al. | |
| 2012/0246120 A1 | 9/2012 | Brooks et al. | |
| 2012/0317146 A1 | 12/2012 | Brooks et al. | |
| 2013/0024906 A9 | 1/2013 | Carney et al. | |
| 2013/0246469 A1 | 9/2013 | Brooks et al. | |
| 2013/0247028 A1 | 9/2013 | Brooks et al. | |

OTHER PUBLICATIONS

Non-Final Office Action from U.S. Appl. No. 13/016,939, dated Oct. 30, 2012.
Non-Final Office Action from U.S. Appl. No. 13/293,083, dated Jan. 24, 2013.
Brooks, D. et al., U.S. Appl. No. 13/485,804, filed May 31, 2012.
Brooks, D. et al., U.S. Appl. No. 13/587,847, filed Aug. 16, 2012.
Non-Final Office Action from U.S. Appl. No. 13/293,080 dated Aug. 27, 2012.
Non-Final Office Action from U.S. Appl. No. 13/293,080 dated Mar. 15, 2012.
Shen et al., "Access Control for Collaborative Environments," ACM, 1992, pp. 51-58.
Non-Final Office Action from U.S. Appl. No. 13/016,949, dated Jul. 5, 2012.
Non-Final Office Action from U.S. Appl. No. 13/016,949, dated Aug. 1, 2013.
Final Office Action from U.S. Appl. No. 13/293,077, dated Oct. 21, 2013.
Non-Final Office Action from U.S. Appl. No. 13/293,077, dated Apr. 10, 2013.
Final Office Action from U.S. Appl. No. 13/293,074, dated Oct. 21, 2013.
Non-Final Office Action from U.S. Appl. No. 13/293,074, dated Apr. 24, 2013.
Final Office Action from U.S. Appl. No. 13/315,237, dated Oct. 21, 2013.
Non-Final Office Action from U.S. Appl. No. 13/315,237, dated Apr. 25, 2013.
Non-Final Office Action from U.S. Appl. No. 13/485,804, dated Aug. 5, 2013.
Non-Final Office Action from U.S. Appl. No. 13/587,847, dated Apr. 15, 2013.
Notice of Allowance from U.S. Appl. No. 13/293,080, dated Feb. 4, 2013.
Notice of Allowance from U.S. Appl. No. 13/293,080, dated May 13, 2013.
Final Office Action from U.S. Appl. No. 13/293,083, dated Oct. 8, 2013.
Non-Final Office Action from U.S. Appl. No. 13/874,337, dated Jul. 10, 2013.

\* cited by examiner

Object Relations

| Directory Entry Object | | | | | |
|---|---|---|---|---|---|
| Field Name | Description | Type | Example | User Edit | Visible |
| Title | Application name | text | Recruitingforce | x | x |
| Version | Version | text | 1.03 | | |
| PackageName | package name | text | recruit-v1 | | x |
| Package | Package id | id | a0030000000raOY | | |
| Company | Developer org Id | id | 00530000000eKXm | | |
| Developer | Developer User Id | id | 00530000000e67Y | | |
| CompanyName | Company name | text | Acme, inc. | x | x |
| DeveloperName | Developer name | text | Bob Jones | x | x |
| Status | Entry status | picklist | public | | x |
| PublishDate | Date of making public | date | 03/04/2005 | | x |
| Modified | record modified by user | checkbox | T | | |
| Abstract | Short 2 line description | textarea | management of recruiting and jobs | x | x |
| Overview | long description of application | textarea long | Lorem ipsum dolor sit | x | x |
| FeatureList | Feature Listing | textarea long | Lorem ipsum dolor sit | x | x |
| Category | Solution Category | multi-select picklist | Sales+commission, Mktg | x | x |
| ApplicationLocale | locale of application | multi-select picklist | en, fr ,(ISO-639/3166 | x | x |
| EntryLocale | locale of description | picklist | en, (ISO-639/3166) | x | x |
| Thumbnail | Image URL | url | http://foo.com/a.jpg | x | x |
| MoreInfoLink | link to more info page | url | http://foo.com/readme | x | x |
| Certified | One of (certified pending) | picklist | certified | | |
| MarketPlace | link to On Demand Marketplace entry | url | http://www.salesforce.com/partners/solution-detail.jsp?id=xxx | x | x |
| SystemReq | other system requirements | textarea | AppFactory, webforce | x | x |
| EditionList | editions app works on | multi-select picklist | all, pe | | x |
| Screenshot | link to single screenshot | url | http://foo.com/b.jpg | x | x |
| Presentation | link to breeze presentation | url | http://foo.com/demo | x | x |
| DevelperNote | optional note from developer | textarea | This app is built on AppFactory see(http://appfactory.com) | x | x |
| TryItUserName | login username for app's Try It org | email | user-001@mf.org | | |
| TryItUserPassword | login password for app's Try it org | text | Good4U | | |
| OneStar | number of 1-star votes | number | 0 | | x |
| TwoStar | number of 2-star votes | number | 22 | | x |
| ThreeStar | number of 3-star votes | number | 40 | | x |
| FourStar | number of 4-star votes | number | 234 | | x |
| FiveStar | number of 5-star votes | number | 2 | | x |

*FIG. 4*

| Directory Entry Related Lists | | |
|---|---|---|
| Object | Description | Type |
| Publisher | user allowed to edit/delete | lookup |
| Import | imports of application | lookup |
| UserReview | comment and rating by a user | lookup |
| RatingHistogram | Votes for rating system | lookup |
| CategoryPage | list of category pages for which this is a featured app | lookup |

| Publisher | | | |
|---|---|---|---|
| Field Name | Description | Type | Example |
| DirectoryEntry | entry to edit | lookup id | a0030000000raOY |
| User | user id | id | 00530000000e67Y |
| UserEmail | email addr of publisher | email | joe@hotmail |
| Edit | edit permission | checkbox | T |
| Delete | delete permission | checkbox | F |
| AddUser | add user permission | checkbox | T |

| Import | | | |
|---|---|---|---|
| Field Name | Description | Type | Example |
| DirectoryEntry | entry to edit | lookup id | a0030000000raOY |
| Org | org the app was imported into | org id | a0030000032raOY |
| User | user id | id | 00530000000e67Y |
| Date | date of import | date | 01-02-2005 |

| UserReview | | | |
|---|---|---|---|
| Field Name | Description | Type | Example |
| DirectoryEntry | entry to edit | lookup id | a0030000000raOY |
| User | user identifier | id | 00530000000e67Y |
| UserAlias | user supplied alias | text | Joe Cool |
| UserEmail | optional email address | email | joe@hotmail |
| Comment | user added comment | textarea | This is cool! |
| Rating | star rating | picklist | 5 |

| CategoryPage | | | |
|---|---|---|---|
| Field Name | Description | Type | Example |
| ParentNode | string reference to parent | picklist (match with solution category) | All-Solutions |
| Category | solution category | picklist (match with solution category) | Financial |
| Label | page title | text | Financial Services |
| Body | Text to display on page | textarea | There are a variety of solutions for ... |
| Count | Number of apps in category | number | 23 |
| FeaturedApp1 | 1st AppEntry to feature | lookup id | a0030000000raOY |
| FeaturedApp2 | 2nd AppEntry to feature | lookup id | a0030000023raOY |
| FeaturedApp3 | 3rd AppEntry to feature | lookup id | a0030000023raOY |

*FIG. 4 (cont)*

Multiforce Projects

? Help

This page allows you to manage Multiforce projects
- You can crate local projects which can then be published to the Multiforce Directory
- You can install projects from the Multiforce Directory or directly fro third parties Current Projects [New]

| Action | | Project Name | Description | Status | Source |
|---|---|---|---|---|---|
| Edit | Del | Bugforce | Bug tracking application | Active | Local |
| Edit | Del | Cool pipeline reports | Custom reports we are developing for demos | Inactive | Local |
| Edit | Del | Competitors tab | Custom tab for tracking competitors | Published | Local |

- This Page Only visible if you have "Create Projects
- Add to project button is controlled by new "Create Projects" perm Installed Projects [Installation Directory]

| Action | | Project Name | Description | | | Action | Source |
|---|---|---|---|---|---|---|---|
| Edit | Uninstall | PRforce | Public Relations Application | | | Installed | Third Party |
| Edit | Uninstall | Customer Service Dashboards | Dashboards for cases & solutions | | | | |

Installation History

| Date | User | Project Name | Action | Source |
|---|---|---|---|---|
| 4/11/2005 10:46 AM | admin@bugforce.com | Prforce | Installed | Mulitforce Directory |
| 4/10/2005 10:46 AM | eric@bugforce.com | Prforce | Uninstalled | Local |
| 4/09/2005 10:46 AM | eric@bugforce.com | Prforce | Installed | Local |
| 3/21/2005 10:41 AM | joe@bugforce.com | Customer Service dashboards | Installed | Third Party |

Download full installation history (csv) #

Sidebar:
- Personal Setup
  - My Personal Information
  - Email
  - Mobile Users
  - Import
  - Office Edition
- Customforce
  - Customize
  - Extend
    - Custom Apps
    - Custom Objects
    - Custom Tabs
    - Custom S-Controls
    - Multiforce Projects
  - Integrate
- Administrative Setup
  - Manage Users
  - Company Profile
  - Security Controls
  - Communication Templates
  - Translation Workbench
  - Data Management
- Order Center

```xml
<!-- P R O J E C T -->
<entity name="Project" keyPrefix="033"
        Access="orgHasTabSet" editAccess="UserPermissions.CustomizeApplication"
apiAccess="orgHasPrivateApi"
        javaPackageRoot="core.project" usesNewURIStyle="true" motifName="Setup"
        isDeleteableViaEntityObject="true"
        dbSchemaName="core"
        comment="All Project definition are managed by this entity.">

<field name="Id" fieldType="PRIMARYKEY"/>
    <field name="Name" fieldType="NAME" columnType="Text" maxLength="80"/>
    <field name="Description" columnType="MULTILINETEXT" maxLength="1000"/>

<field name="Overview" fieldType="FOREIGNKEY" domain="Document"/>
    <field name="Status" columnType="STATICENUM" enum="ProjectStatus" dbValueRequired="yes"/>
    <field name="Source" fieldType="FOREIGNKEY" domain="Organization"/>

<field name="CreatedDate" fieldType="CREATEDDATE"/>
    <field name="CreatedBy" fieldType="CREATEDBY"/>
    <field name="LastModifiedDate" fieldType="LASTUPDATE"/>
    <field name="LastModifiedBy" fieldType="LASTUPDATEBY"/>
    <field name="SystemModstamp" fieldType="SYSMODSTAMP"/>
</entity>

<!-- P R O J E C T   M E M B E R -->
<entity name="ProjectMember" keyPrefix="034"
        access="orgHasTabSet" editAccess="UserPermissions.CustomizeApplication"
apiAccess="orgHasPrivateApi"
        javaPackageRoot="core.project" usesNewURIStyle="true" motifName="Setup"
        isDeleteableViaEntityObject="true"
        plsqlPackage="cProject" dbSchemaName="core"
        plsqlGetDetail="get_project_member" plsqlGetEdit="get_project_member_edit"
        plsqlInsertDetail="insert_project_member" plsqlUpdateDetail="update_project_member"
        plsqlApiGetList="api_project_member_get_list"
plsqlApiGetBulkIdList="api_project_mbr_get_blkidlist"
        plsqlDelete="delete_project_member"
        comment="All Project Members for a specific Project are managed by this entity.">
    <field name="Id" fieldType="PRIMARYKEY"/>
    <field name="Project" fieldType="FOREIGNKEY" domain="Project" dbValueRequired="yes"
            updateNormallyToDb="no" alternateKeyIndex="0" parentRelationshipName="Project"
    childRelationshipName="ProjectItems"/>

<field name="Subject" fieldType="FOREIGNKEY" dbValueRequired="yes"
            Domain="Project,TabSet,CustomEntityDefinition,CustomFieldDefinition,Scontrol,EmailTemplate,Layout,ListLayout,ProfileLayout,Document,Folder,Report,Dashboard,Filter,User,Profile,CustomEntityDataTemplate"/>

<field name="OriginalSubject" fieldType="FOREIGNKEY" dbValueRequired="yes"
            Domain="Project,TabSet,CustomEntityDefinition,CustomFieldDefinition,Scontrol,EmailTemplate,Layout,ListLayout,ProfileLayout,Document,Folder,Report,Dashboard,Filter,User,Profile,CustomEntityDataTemplate"/>

<field name="CreatedDate" fieldType="CREATEDDATE"/>
    <field name="CreatedBy" fieldType="CREATEDBY"/>
    <field name="LastModifiedDate" fieldType="LASTUPDATE"/>
    <field name="LastModifiedBy" fieldType="LASTUPDATEBY"/>
    <field name="SystemModstamp" fieldType="SYSMODSTAMP"/>
</entity>
```

*FIG. 8*

SYSTEM, METHOD AND COMPUTER PROGRAM PRODUCT FOR VALIDATING ONE OR MORE METADATA OBJECTS

CROSS-REFERENCES TO RELATED APPLICATIONS

This application is a continuation of U.S. application Ser. No. 13/315,237, filed Dec. 8, 2011, which is a continuation of U.S. application Ser. No. 13/016,949, filed Jan. 28, 2011, which is a continuation of U.S. application Ser. No. 11/530,394, filed Sep. 8, 2006, which claims the benefit of U.S. Provisional Application No. 60/715,749, filed Sep. 9, 2005, the disclosures of which are incorporated herein by reference in its entirety.

FIELD OF THE INVENTION

The present invention relates generally to databases, and more particularly to systems and methods for creating and exchanging customized applications in a multi-tenant and/or multi-application database system.

BACKGROUND

Not too long after inventing numbers and a writing system, early humans realized that they had inadvertently created information. With the creation of information came a problem that would vex humankind for the next several millennia: how to store and manage the information.

Fortunately, the amount of information created by early humans was relatively small and could be tracked using ten fingers and ten toes. Stone or clay tablets were employed to track information when a more permanent record was desired. One early well known example of this mechanism was used by Moses, who stored a body of Ten Commandments on two such stone tablets. These mechanisms were limited, however, to write-once, read-many implementations and were tightly constrained in capacity.

With the advent of the Gutenberg printing press, came the ability to store larger quantities of information as well as to produce copies of stored information in volume. While, these mechanisms also were limited to write-once, read-many implementations, they facilitated the widespread dissemination of knowledge, which in turn accelerated the advance of technical progress. A few centuries later, the computer and database software systems appeared. The computer database provided large capacity, write-read storage in a readily available package. For awhile, it appeared that humankind's age old information storage and management problem had finally been solved.

Computer databases, however, are plagued by numerous problems. Each organization, business or agency, installs its own copy of the database. It was not long, however, before users wished to add their own custom objects and applications to their database in addition to the standard objects and standard applications already provided. The desire for customization lead to disparate schema, an organization of the types of information being stored in the database, as well as applications relying upon that schema being implemented by different users. Disparate schema, in turn blocked any hope of users in different organizations of sharing information or applications among one another.

BRIEF SUMMARY

In accordance with embodiments, there are provided mechanisms and methods for creating, exporting, viewing and testing, and importing custom applications in a multi-tenant database environment. These mechanisms and methods can enable embodiments to provide a vehicle for sharing applications across organizational boundaries. The ability to share applications across organizational boundaries can enable tenants in a multi-tenant database system, for example, to easily and efficiently import and export, and thus share, applications with other tenants in the multi-tenant environment. As used herein, the term multi-tenant database system refers to database system implementing a multi-tenant architecture that enables customer organizations (i.e., tenants) to share applications and data, and database resources, in one logical database. In multi-tenant database environments, even the database tables themselves can be shared across the tenants. For example, each entity in the data model could contain an organization_id column that distinguishes rows for each tenant. Queries and data manipulation in the context of a tenant filter on this (indexed) organization_id column to ensure proper security and the appearance of virtual private databases. This strategy enables multi-tenant database embodiments to be able to expose standard entities such as Account, Contact, Lead, and Opportunity entities to customers.

In embodiments, using the same physical storage mechanism and schema for the exported container organization as for all other organizations in the multi-tenant database system provides the capability to assure that the container organization can be seamlessly upgraded going forward.

In embodiments, a package that defines an application is created to facilitate exporting the application. The package may contain metadata and other materials that define the application. When the package is imported into a recipient organization, the package is kept logically separate for the lifetime of the organization. Thus embodiments preserve the uniqueness of the imported package, enabling a user at the recipient organization to be able to navigate to the package as a separate item. Embodiments provide the capability to disable changes to the imported objects in the package as well as to uninstall the package in the future.

According to one aspect and by way of example, the ability to define and exchange application functionality with other organizations in a multi-tenant database is provided by creating a package, including metadata, that defines an application at a creating organization and providing the package to another organization. Optionally, the creating organization may provide access to the application by publishing metadata from the package in a directory of applications, or may provide a link to the package, such as for example a URL, to another organization. Interested organizations with access to the application package may view and test such a published package, as well as import and install the package.

According to another aspect, a directory of applications is provided. The directory is an online catalog of user-developed applications. The directory includes publicly available applications and private applications that may not be accessed without knowledge of the correct link to the package. Visitors accessing the public directory are able to learn about available applications, view descriptions of applications developed by application builders, and gain access to the import (installation) URLs. Application developers visit the directory site to submit and maintain descriptions of applications they have created, whether public or private. To ensure quality, application entries may be reviewed by internal directory management personnel before being added to the public directory. In one aspect, community feedback in the form of user-submitted ratings, comments, and number of installations are included in the directory and provide a potential recipient a way to gauge the reputation and value of each application. Visitors may browse for applications by business solution category, or sorted by highest rating, developer name, most popular, and other ordering mechanisms.

According to another aspect of the present invention, a method is provided for sharing an application in a multi-tenant database environment including a multi-tenant database that stores data and objects for a plurality of organizations. The method typically includes creating a package metadata object that references a set of one or more metadata objects associated with a first organization, storing the package metadata object in a database system, and allowing access to the package metadata object to a user in a second organization. In certain aspects, a method is provided that typically includes creating a package comprising an object and a set of one or more objects that are dependent upon said object, wherein the object and dependent objects are associated with a first organization, storing the package in a database system, and allowing access to the package to a user in a second organization. In certain aspects, the methods include validating the package metadata object or the package.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 4 shows a definition of a DirectoryEntry object and other objects in an embodiment.

FIG. 6 shows an example of a GUI screen that allows a user to create a package in an embodiment.

FIG. 7 shows an example of a GUI screenshot showing information, including included items, for a created package in an embodiment.

FIG. 8 shows an example of a Project data model definition and a Project Member data model definition in an embodiment.

DETAILED DESCRIPTION

In embodiments, the present invention provides systems and methods for creating and exchanging customized applications in a multi-tenant database system.

Customers may wish to add their own custom objects and applications to their database system in addition to the standard objects and standard applications already provided. In a traditional client/server application, where the customer has its own physical database, adding custom objects is typically done via DDL (data definition language) against that database to create new physical schema—tables and columns. In an online multi-tenant database system, this approach may be untenable for various reasons. For example, for a database system with a large population of tenants (e.g., on the order of 1,000 or 10,000 or more tenants), the union of all desired schema would overwhelm the underlying data dictionary catalog (e.g., Oracle dictionary). Additionally, the maintenance of all of these schema objects would be a nearly impossible burden for DBAs (database administrators). Further, current relational databases do not support online DDL (in a highly concurrent transactional system) well enough for organizations to remain logically independent. Specifically, the creation of schema by one organization could lock an application for all other customers causing unacceptable delays.

Many application platforms have the concept of different applications that one can install. Windows, for example, has applications that can be installed as does Linux and other operating systems. Several websites allow one to browse and select applications for download and installation. For example, CNET has the download.com site that allows one to download PC based applications. Other enterprise software toolkits have the ability to specify a package of metadata and export it from one environment and import it into another. For example, Peoplesoft has the ability to do this using either importing/exporting over an odbc connection or via a flat file. With flat file and odbc based approaches, there exists the risk of not being able to import packages that were defined or exported using a previous version. Microsoft has an office directory that allows one to download useful spreadsheet or word document templates from their central web site. However, these systems do not allow users to easily and efficiently import and export applications in a multi-tenant environment. These systems also do not preserve the uniqueness of an imported application; one cannot navigate to it as a separate item. Other systems also do not allow one to disable changes to the imported objects in the imported application and uninstall the application in the future.

Figure 1:
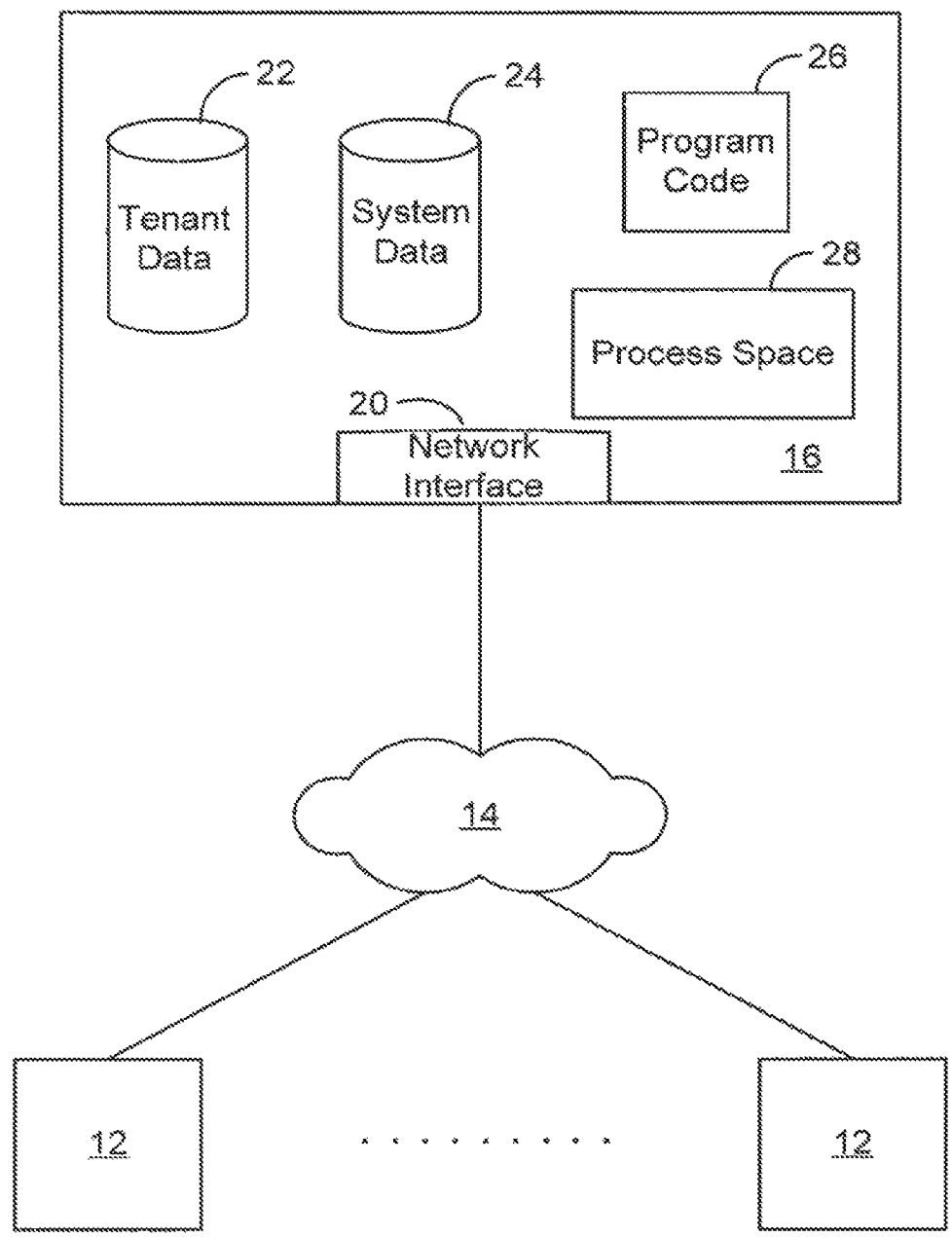
FIG. 1 illustrates an environment wherein a multi-tenant database system might be used.

FIG. 1 illustrates an environment wherein a multi-tenant database system might be used. As illustrated in FIG. 1 any user systems 12 might interact via a network 14 with a multi-tenant database system (MTS) 16. The users of those user systems 12 might be users in differing capacities and the capacity of a particular user system 12 might be entirely determined by permissions (permission levels) for the current user. For example, where a salesperson is using a particular user system 12 to interact with MTS 16, that user system has the capacities allotted to that salesperson. However, while an administrator is using that user system to interact with MTS 16, that user system has the capacities allotted to that administrator. Thus, different users will have different capabilities with regard to accessing and modifying application and database information, including tab and tab set definition and profile information, depending on a user's permission level.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Each of the plurality of servers has access to the MTS's data, at least as for the users that are accessing that server.

In one aspect, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept logically separate from that of other tenants so that one tenant does not have access to another's data, unless such data is expressly shared. In aspects, system 16 implements applications other than, or in addition to, a CRM application. For example, system 16 may provide tenant access to multiple hosted (standard and custom) applications, including a CRM application.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application hosting service.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by MTS 16 or other systems or servers. For example, the user interface device can be used to select tabs and tab sets, create and modify applications, and otherwise allow a user to interact with the various GUI pages, for example, as described in U.S. patent application Ser. No. 11/075,546, which is incorporated by reference in its entirety herein.

As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel® Pentium processor or the like, or multiple processor units. Computer code for operating and configuring MTS 16 to intercommunicate and to process web pages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any other information storage media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, any other markup language, Java™, JavaScript, any other scripting language such as VBScript, and many other programming languages as are well known. (Java™ is a trademark of Sun Microsystems, Inc.)

According to one embodiment, each MTS 16 is configured to provide web pages, forms, applications, data and media content to user systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
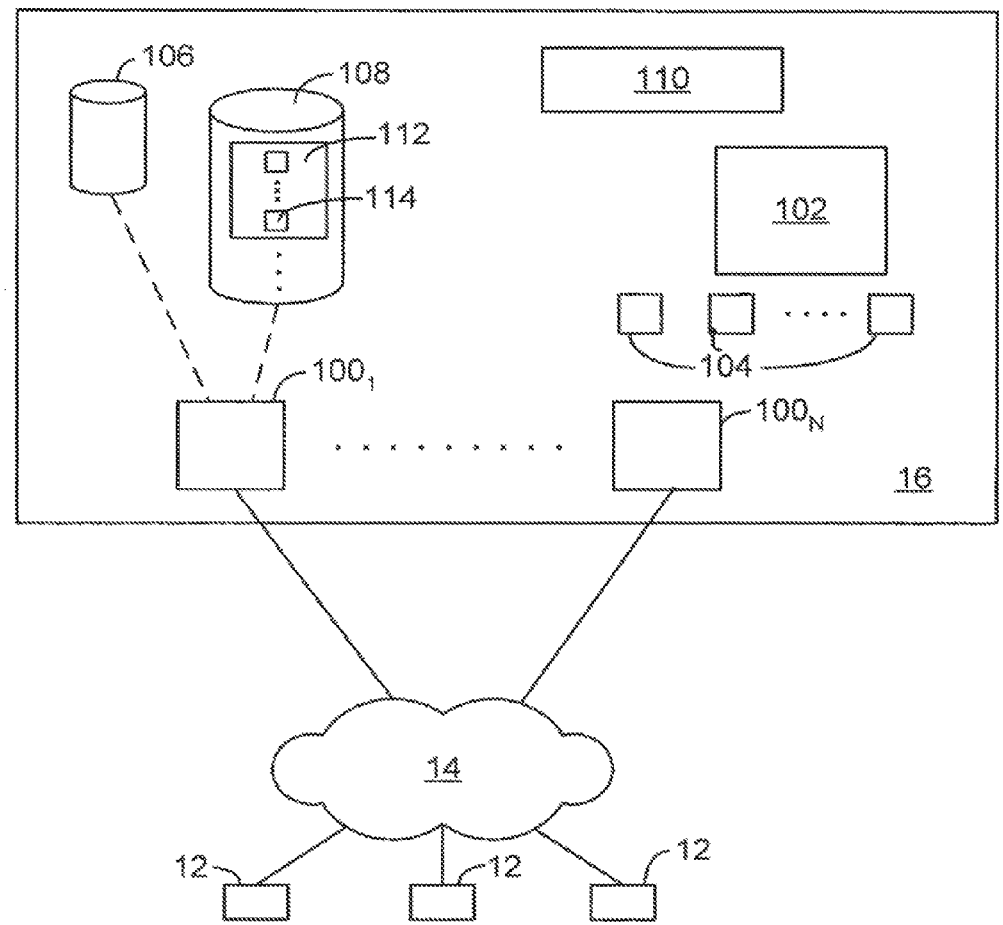
FIG. 2 illustrates elements of FIG. 1 and various interconnections between the elements.

FIG. 2 illustrates elements of MTS 16 and various interconnections between these elements in an embodiment. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user.

It should also be understood that each application server 100 may be communicably coupled to database systems, e.g., system database 106 and tenant database(s) 108, via a different network connection. For example, one server 100$_1$ might be coupled via the Internet 14, another server 100$_{N-1}$ might be coupled via a direct network link, and another server 100$_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of, and access to, different objects, data and applications across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are additional critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. For example, in one aspect MTS 16 (e.g., an application server 100 in MTS 16) generates automatically a SQL query including one or more SQL statements designed to access the desired information.

Each database can generally be viewed as a collection of objects, such as a set of logical tables, containing data placed into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged, e.g., as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields.

According to one aspect, a user can design their own custom applications including custom objects, custom tabs, custom fields, and custom page layouts. U.S. patent application Ser. No. 10/817,161, entitled "Custom Entities and Fields in a Multi-Tenant Database System" filed on Apr. 2, 2004, which is herein incorporated by reference in its entirety, discloses systems and methods for creating and customizing objects such as entities and fields. The systems and methods presented therein offer a flexible approach to storing variable schema data in a fixed physical schema. Tabs and tab sets can also be created and customized to define relationships between custom objects and fields, standard objects and fields, and applications and to track related data. U.S. patent application Ser. No. 11/075,546, entitled "Systems and Methods for Implementing Multi-Application Tabs and Tab Sets" filed on Mar. 8, 2005 which is herein incorporated by reference in its entirety, discloses systems and methods for creating and customizing tabs and tab sets in a multi-tenant environment. A brief summary of tabs and tab set creation and functionality as described therein follows.

Custom Tabs and Tab Sets

In embodiments, a tab represents a user interface into an element of an application or into a database object. Selection of a tab provides a user access to the object or element of the application represented by the tab. A tab set is a group of related tabs that work as a unit to provide application functionality. New tabs and tab sets may be defined and tab set views may be customized so that an end user can easily and conveniently switch between the various objects and application elements represented by the defined tabs and tab sets. In one aspect, for example, tabs and tab sets may be used as a means to switch between applications in a multiple application environment, such as an on-demand web-based hosted application environment.

A tab set typically includes a name, a logo, and an ordered list of tabs. A tab set is typically viewed in a graphical user interface (GUI) environment, e.g., using a browser application running on a user's computer system. A standard tab set definition may be provided by a host system, e.g., MTS 16. Standard tab sets are pre-defined sets of tabs, e.g., imported from a source that provides a capability (e.g., templating capability) that determines which tabs, tab sets and data a tenant or user is initially provisioned with. One example of standard tab sets are provided by the salesforce.com website through its subscription CRM service. Using these standard tab sets, users are provided access to standard tables or entities such as Account, Contact, Lead and Opportunity entities. As another example, in the salesforce.com service, a user can create custom entities as well as custom fields for standard entities, and a user can create a tab set including tabs representing custom entities and fields.

A user may create custom tab sets and custom tabs. Preferably only administrator level users are provided with tab set creation functionality based on their stored permissions. Additionally, users may customize their view of tab sets, including the order of displayed tabs and which tabs in a tab set are displayed. To allow users to conveniently organize their tabs, each tab may appear in any and all tab sets if desired. Preferably, any user can edit tab combination and order, but cannot rename or replace a logo; tab set naming and logo selection are preferably only administrator level functions. For example, administrators may create new tab sets and customize existing tab sets. For all tab sets, an administrator can specify which tabs are included, and the order that the tabs should be displayed. For organization-specific tab sets, an administrator can also specify the name and provide an optional logo. For standard tab sets provided by the host system, e.g., tab sets provided by salesforce.com, such as Salesforce and Supportforce tab sets, an administrator is barred from changing the name or logo, nor can the administrator delete the standard tab set. Preferably, any user can fully customize their view of all the tab sets they have permission to view. The tabs a user can view (and use) are based on the user's permission level. A profile for each tab set allows an administrator level user to set the profile level viewability of tabs and tab sets, e.g., so that groups of users at certain permission levels may be restricted from viewing (and using) certain tabs or tab sets, and therefore also may be restricted from accessing or viewing certain objects and applications referenced by the restricted tabs or tab sets.

Thus, in one aspect, a tab set can be thought of as a filter that is overlaid on top of an existing profile-level tab visibility definition. An administrator sets the default tabs that are included in each tab set filter, but each user can override as they like—the only thing they preferably cannot change is the tab set name and logo. The net result is that tab sets are quite lightweight and flexible. A particular meaning to a tab set is not enforced; each user can generally use tab sets as they wish.

Creating and Exchanging Applications

In one embodiment, users have the ability to create, post and exchange applications. As used herein, in one aspect, an application is a group or package of multi-tenant database setup data (e.g., metadata) that defines its data model, user interface and business logic. For example, the user may define a tab set, which logically defines the group of metadata that makes up an application. As used herein, a "package" is a metadata object that references the set of metadata objects used in an application in an organization. As used herein, an "organization" can mean a single tenant in a multi-tenant system and/or a set of metadata (both application data and metadata) for a single tenant in a multi-tenant system.

In one embodiment, the present invention refines the concept of a tab set by allowing a user to precisely define a metadata "package" which includes all setup data (e.g., custom object definitions, page layout definitions, workflow rules, etc.) that make up an application. A package may include 0, 1 or more tab sets. The user can then export this package from one "source" organization to a "container" organization that is not associated with any tenant in the database system. An exported package is registered with or listed in an application directory. A user that creates and/or exports a package will be referred to herein as a source user or exporting user. The source user can choose to have the package name and application listed in a public portion of the application directory. Another user can import the package into a separate "target" organization allowing this organization to use the application independently of the creating organization. A user that views and/or imports a package will be referred to herein as a viewing user or importing user.

Upon selecting a package for import, code on the server system takes the metadata from the container organization, selects the appropriate recipient organization, reads the metadata from the container organization, and writes that metadata into the recipient organization. Any conflicting metadata (e.g., object or field names) can be resolved by the importing user, e.g., by aborting or by renaming recipient organization objects, fields, etc. It should be noted that the import process preferably does not overwrite any existing recipient organization fields. Also, an import user can uninstall the imported application.

Embodiments of the package creation process and the export and import processes will now be described.

Package Creation

In the source organization, a source user creates a package definition by selecting the appropriate setup data (metadata). This defines the group of setup data that makes up the application. For example, the source user may select a high level tab set (group of tabs). The system then automatically determines object dependencies for the metadata included in the package. For example, in one aspect, the system automatically executes a dependency finder process (e.g., a process that "spiders" through the object schema and searches for object dependencies) to determine all related objects that are required to use functionality provided by the tab set. In one aspect, this is done in two passes—first top down, then bottom up to determine all inverse relationships between objects in the system and those identified by the tab set. Additionally or alternatively, the source user may explicitly specify the collection of setup data to include in the package.

In one aspect, one or more of the following items (pieces of metadata) can be included in a package:
1. Tab set (this would copy everything referenced by the tab set definition)
2. Custom Object
   a. Custom fields
   b. Relationships (master-detail and Lookup)
   c. Picklist values,
   d. Page layouts,
   e. Search layouts,
   f. Related list layouts,
   g. Public list views,
   h. Custom Links
   i. Any other items associated with the custom object
3. Custom Tab Definition
4. S-control, which in one aspect is a JavaScript program that performs custom User Interface and business logic processing. A package creator may specify the s-control that runs on a tab or section of a page so that when a user navigates to the tab or page, an application server downloads the JavaScript for execution on a browser. An API is used to save data back to the service when necessary.

Figure 7:
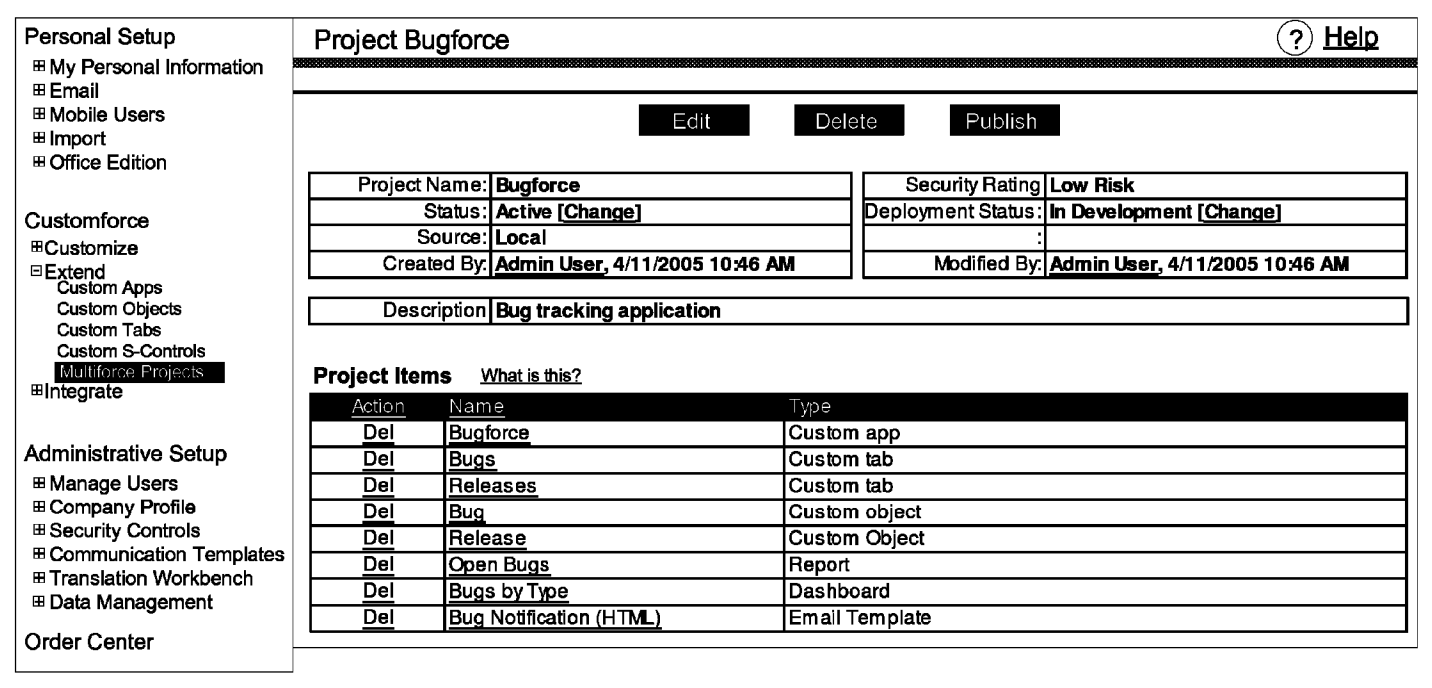

5. Custom Report (One Report Folder will be created for each new app.)
6. Dashboard
7. Email Template
8. Document
9. Profile Packages (Including FLS for Custom Objects) (Bundles of permission data associated with profiles, to be defined later)
10. Dependent picklists
11. Workflow rules
12. Record types Additional metadata items that may be copied may include:
1. Custom fields for Standard objects
2. Mail Merge Templates
3. Business Processes
4. Assignment Rules (A form of workflow)
5. Auto-response rules (A form of workflow)
6. Escalation rules (A form of workflow)
7. Big Deal alerts/Opportunity Reminders
8. Self Service Portal Settings
9. VLO features, which in one aspect includes definitions of different "divisions" within a company or organization. VLO features allow an application to partition data by divisions and thus limit the scope of reports and list views.
10. Delegated Administration settings
11. Home Page Components FIG. 6 shows an example of a GUI screen that allows a user to create a package, e.g., by selecting "New" with a pointing device, as well as delete and edit existing packages, view a history of installed packages and access a directory from which to install a package. FIG. 7 shows an example of a GUI screenshot showing information, including included items, for a created package. A user is able to edit, delete and publish a package using such a screen.

A user may select to edit a package, e.g., by deleting items or adding items. For example, if a user selects to delete a custom object (or other metadata that is included in a package), the system detects this and alerts the user. If the user wishes to proceed, the metadata is then removed from the package. The next time the user views the package items, the deleted items will be gone. If the package has been exported, the metadata in the exported package is not affected. This feature provides a backup to metadata, but does not provide backup to any records which might have been created, although these records can be saved using a data loader or an Excel plug-in. If a user decides to add new items to a package, a picklist of items available for inclusion may be provided. Any item may be included in more than one package.

When adding an application (e.g., a tab set and/or other metadata items) to a package, the system should add all custom items which are related to this application. This includes the custom tabs, the objects behind the tabs, and any custom objects which are related to these. Ideally, the dependency finder process (e.g., spider process) will also detect any custom objects which are related to any standard tabs which make up the added application as well. Even though these standard objects may not be included in the package, the junction objects and other related objects are part of the functionality embodied in the application. Certain object dependencies should always be included. For example, in certain aspects, all the custom fields on a custom object are included with a custom object, and all page layouts are included with a custom object. In certain aspects, custom object related list layouts (that appear on standard objects) are automatically included as well.

Once the user has finished defining the package, the package is validated. This can be done automatically by the system, e.g., when a user indicates that the package is complete, or it may be done responsive to a user request to validate, e.g., the user selecting a "validate" or similar button on a GUI. This invokes the spidering process that makes sure all required setup data is included in the package definition. This is useful in case a user has changed metadata in the package (e.g., added a relationship, another tab or object, etc.) since metadata items were first added to the package.

In one embodiment, a package is stored in the database as a set of primary keys of the objects included in the package. FIG. 8 shows an example of a Project data model definition and a Project Member data model definition according to one embodiment.

Package Export

After defining the package, the source user can choose to export the package. Exporting the package makes it available for other organizations to import. In one aspect, when exporting a package, the source user is able to specify whether to allow customizations of the application after it has been imported into other organizations. For example, in certain aspects, a flag is set (by the source user) in the package definition to indicate whether customizations to an exported package are subject to upgrade. In certain aspects, a flag is set (by the source user) to indicate whether a particular component/object in the package can be altered at all.

Exporting is implemented, in one aspect, by the system automatically creating a new organization definition, e.g., with an organization of type "container", that includes a copy of all items (metadata) in the package including dependent object metadata not explicitly included by the export user in the package definition. In one aspect, this container organization shares the same physical database (e.g., Oracle database) schema as all other organizations. However, the container organization could reside in a different, separate database. Further, this type of organization (org) is preferably ignored by standard expiration and billing processes where applicable. In certain aspects, where multiple database instances are present in a database system environment, an exported package is stored to one of the database instances as a container organization. The container organization is replicated to one or more or all of the remaining database instances. The multiple database instances may, for example, be associated with different geographical regions. For example, one database instance might be associated with Europe (EP) and one might be associated with North America (NA). In this manner, staggered and independent upgrading of database instances is facilitated. For example, installs of packages may continue as new releases/upgrades to the database system are implemented in different instances. For example, where the EP instance is upgraded before (e.g., one or two weeks) the NA instance, installs of package X for NA would happen from the NA instance, and installs of package X for EP would happen from the EP instance replicated copy of package X. This ensures installs from like versions would occur.

When the export process completes, the source user receives a URL that includes a unique key of the container organization. Anyone who knows the URL is able to access and import the package in the identified "container" organization into their own organization, e.g., the metadata associated with that package is copied or instantiated into the schema associated with that organization. The source user may send the URL to another user at another company, or the source user may post the URL to a directory as will be described in more detail below.

Once a package is exported, the package remains open in the source organization, and the source user can continue to change it. However, the copy of the package in the container organization is preferably locked from further changes.

A source user can export the same package multiple times, creating multiple container organizations. This allows a source user to create a version history of how the package changes over time.

After the source user creates and exports the package to a container organization, they can optionally create a second new organization object with organization type "demonstration". The demonstration organization has its own user id(s) and password(s). Any user who knows the id and password can log into the demonstration organization and view the exported package. Once logged in, the viewing user can manually validate that the required objects are present and the application works as expected. If the exporting user specified that sample data be included in the export package, a viewing user can see the sample data when logging into the demonstration organization or they can add their own sample data directly into the demonstration organization. In one aspect, the source user must create a demonstration organization for their package before they publish it to the public directory. This assures that users browsing the directory have a place to "try out" the application before they choose to download or import the package. For example, a package may include a web integration link (WIL)—it is very useful to examine WILs in the demonstration organization to ensure that the services being used by WILs are trusted.

Once a demonstration organization has been created for a package, the source user can "publish" the package to a centralized public directory. Upon publishing, the system notifies the central directory to include the package by sending a message to the directory service. This message, in certain aspects, contains a URL that allows users to navigate from the public directory back to the container organization and import it. The message, in certain aspects, also includes a URL of the demonstration organization. This allows users browsing the public directory to "try it now"—they can log into the demonstration organization and thoroughly inspect the functionality. In certain aspects, the message includes descriptive data about the package (e.g., name, description, etc) and a list of objects included in the package. The directory uses this information to provide detailed information for users browsing the directory looking for packages to import. Additional details about the public directory are described below.

Package Import

To import and install a package into an organization, an import user navigates to the URL that was generated by the package export process, either through the directory, or via a message from the source user. This URL contains a unique key that identifies a particular exported application and package. The import user may have found this URL by browsing the public directory, or the exporting user may have simply emailed the URL to that user. When the import user clicks on the URL they are able to access, view and import the package.

In one aspect, installation is a multi-step process with one or more steps performed in the installation wizard. For example, in one aspect, the steps include providing a display of the package contents for the user to examine and confirm they want to install, configuring the security for the existing profiles in the installer's organization, importing the package contents, and deploying the application to the intended users. An import user may also choose to customize any items in the install package.

In certain aspects, some or all of the following steps may need to be performed or may occur during the package import and install process:

Log into the recipient organization by entering a UserID and Password. This is a user id for the recipient organization into which the package is to be imported.

Optionally, the exporter may have password protected the package. If this is the case, the import user has to enter the package password before they can import it (this is a different password than the user password required to log into the recipient organization).

If object names in the package conflict with setup data in the recipient organization, the import process may fail. The import user may change the object names on conflicting objects within the recipient organization and restart the import process.

During the import process, the recipient organization is locked to prevent inconsistent metadata updates.

The import process checks to make sure the importing user has appropriate organization permissions to import a package.

The import user is asked to define mappings from source organization specific references in the package to values appropriate for the recipient organization. For example, the import user may be prompted to specify a user id, profile or role.

The setup data is copied into the recipient organization in a "development" mode. This allows the import user to verify that the application functions correctly before deploying it to users within the recipient organization.

The import process scans the package for malicious functionality. For example, it can check for any Web Integration Links (WILs) that may post data to third party websites.

If specified in the package definition, the import user is unable to change any of the setup data in the package after it is imported. For example, the import user cannot add or remove fields from a custom object after it is imported if specified in the package definition. This is implemented by the custom object edit screen functionality checking the package definition tables before allowing any edits to an object in the recipient organization.

The import user can optionally "uninstall" a package. This can be implemented because the system keeps track of which metadata objects belong to the package (e.g., through the package database schema).

In certain aspects, packages may be upgraded. For example, if a publisher/export user changes the source package, the import user can choose to pull into their organization the change(s) made by the publisher while preserving any data rows the subscriber had creating since first importing the package. According to certain aspect, one or more flags may be set in the package definition to determine whether and to what extent customizations to a package may be made and upgraded. In one aspect, a "manageable" field is provided to identify whether customizations to a particular object are subject to upgrade. For example, if the package or an object in the package is marked as managed, the user is allowed to customize the package or the object, and these customizations will not be altered upon upgrading of the package. In another aspect, a "control" field is provided to identify whether an object may be modified by the publisher and/or the subscriber. In another aspect, an "immutable" field is provided to identify whether an object can or cannot be altered by anyone.

For example, the source user can set the immutable flag so that nobody is able to modify the packages after it has been published. An upgrade process that executes checks each of these fields, where present, to determine the extent that customizations are maintained upon upgrading.

Application Directory

The present invention also provides a central directory of applications; source users can register packages in a central directory. In one aspect, the central directory includes a public portion that includes published packages intended for use by anyone, and a private portion that includes packages not intended for general use (e.g., packages intended for use by import users as selected by the source user). The directory allows other users to browse published applications and choose which ones they want to install into their organization. In one aspect, the central directory is organized by a category hierarchy that allows users to search and browse by category for the types of application they're interested in. In one aspect, the directory allows users to "try it now"—they can look at the demonstration organization containing the package before they install it into their organization. In another aspect, the directory provides an automated approval process that assures submissions are acceptable before they appear in the public directory. In another aspect, the directory includes a ratings system that allows (import) users of an application to vote on an application's usefulness and quality. This voting appears in the public directory for other users to see.

In certain aspects, the directory is built using JSP pages, JSTL, a JSP tag library, JSP tags, and Java classes. In one aspect, data used by the directory is stored in an organization object managed by one or more directory administrators. Source users of applications may use the directory to input and maintain descriptive information held in a DirectoryEntry object for each application. Directory entries have an associated status field and only applications having a status of "published" or "public" are rendered for a visitor. A status of "preview" allows source users and directory administrators to see results as they will appear on the web before they become public. In one aspect, a display of applications according to solution categories is dynamically rendered based on a category picklist of values. An applications is tagged with the categories to which it belongs using a multiple-select picklist. A new value may be added at any time to the picklist and category label to create a new category.

Roles and Publishing Model

Except for visitors browsing the site, almost all other uses of the directory site should require the user to either login or have a valid session id. These users may play different roles and may have different permissions to perform actions according to these roles. For example, three basic roles might include developer, publisher, and importer.

Developers should be able to hand responsibility for publishing the application over to another trusted person through creation of a publisher role and editing permissions. A publisher (which defaults to the developer himself) may be granted permission to create the original directory entry describing the application, modify it at a later date, add other publishers to assist, or even remove the entry from the directory. As used herein a source user can be either or both of a developer and a publisher.

The user id of the person logging into the directory is used to determine the roles and rights the user has in regards to each application. Users should have no real access to the organization in which the directory is kept. User id's are, however, used to uniquely identify users and to retrieve information from their own organizations when necessary.

A developer is an original creator of the application and its package through a setup wizard. One (optional) step in the wizard is to submit the application for publication in the Directory. There, the developer, may either enter information himself or designate others to serve as the publisher and maintainer of the directory entry. A publisher of a given directory entry is a user who is responsible for entering and maintaining descriptive information about the application in the directory. Each application's directory entry has an assigned set of publishers along with permissions granted by the original submitter. These permissions give rights to edit fields, change status, remove the application from the directory or even add others as publishers (e.g., with the same or lesser permissions). An importer is any import user, e.g., system administrator of an organization or tenant, who has initiated the import process of an application for deployment in their own organization. During the import process, a record is created in the database system showing what organizations have which applications imported and by whom. This may be used to show how popular an application is and if it is desirable, to restrict comments and ratings to only those users of organizations that have the application installed. Individuals may participate in multiple roles at different times; i.e., a user may be a developer of one application and an import user for another.

Review of Directory Information

Publishers create an application's directory entry, input associated information such as a description, thumbnail, screenshots, and other information. Prior to becoming public, a publisher may preview this information at any time. When the information is ready to be made publicly available for viewing, the publisher changes the state to "submitted". In one aspect, this initiates a review of the application by a directory administrator, who may request further information, etc. Once the application has completed review, the directory administrator changes its state to "public". This makes the application available for public viewing within the directory. Depending upon the business process, the public state may also lock out any further changes by publishers. In this case, should the publisher need to update the directory entry after being made public, a request could be filed with the directory administrator to remove the entry from public view, e.g., by changing the state back to new. If it is desirable to allow publishers to modify entries without requesting permission to change and another round of review, a Modified flag in the directory entry can be used to simply indicate that a public entry has been changed.

Reputation Management Through User Ratings and Comments

In one aspect, to give visitors an idea of what others think about each application, viewing users may assign a rating to the application and provide personal reviews in the form of comments. In one aspect, only users of organizations that have actually installed the application may provide comments and/or ratings. This entitlement could be deduced, for example, by looking at the import records created by system administrators who initiated the application installation.

To keep ratings an honest reflection of how the community rates the application, however, it may be necessary to provide some protection from users gaming the system by making multiple postings. In any case, users may want to change their rating of an application from what they initially rated. In one aspect, this is accomplished by treating the ratings system as one would voting; each user casts a vote for one of five possible star ratings associated with the application and each application keeps a tally of the votes for each of the possible ratings. It then becomes trivial to determine the average rating for each application and also yield a more informative histogram of the votes. Users may change their vote at any time, but no matter how many times they make a rating, they only get to vote once per application. A record is kept for each user of their current rating for applications that they have rated or commented on.

Directory Data Model

Figure 3:
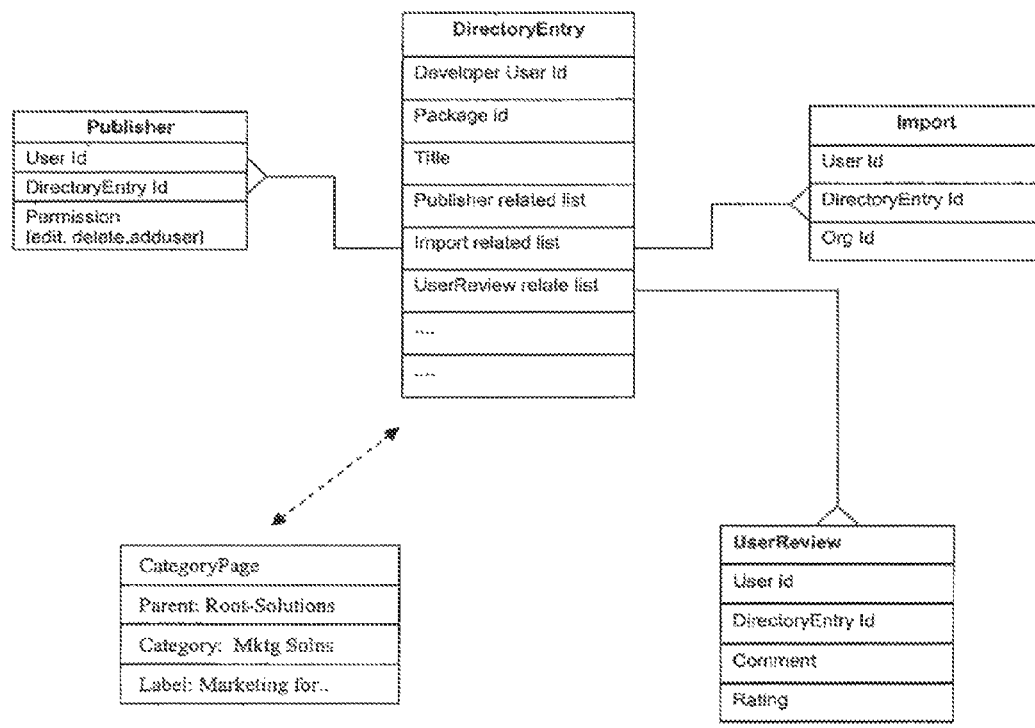
FIG. 3 shows a data model for a Directory of applications in an embodiment.

FIG. 3 shows a data model for a Directory of applications according to one embodiment. As shown, the Directory data model according to this embodiment includes five main objects: DirectoryEntry, CategoryPage, Publisher, Import and UserReview. It should be appreciated that fewer or more objects may be used.

The DirectoryEntry object holds information pertaining to each individual application submitted for publication. Information is written to this table by the web site during application submission or modification and may be reviewed and modified by the appropriate internal directory support personnel. FIG. 4 shows a definition of a DirectoryEntry object and other objects according to one embodiment.

Associated with each entry in the DirectoryEntry object is a status field indicating the status of the directory record. The values allow coupling the external input and editing functions with an internal process of review and preview. Status values might include:

New: first created with only minimal information
Submitted: entry ready for internal review before publishing
Preview: allows internal site provider personnel to preview information in the context of the site
Public: publishable, ready for public viewing
Inactive: no longer visible in the directory (deleted)

When the state is changed to Public, the developer and other publishers for the application are notified, e.g., by e-mail, and a publish date field or variable is set.

According to one aspect, each entry is associated with a multi-select picklist field representing the solution categories under which the application will be listed. The directory dynamically adapts to categories so they may be added at any time. For readability, in one aspect, the picklist values encode the category and/or subcategory into each name.

The total user votes for a rating, e.g., 1-5 stars, are stored in fields from which the average can be computed. Also, the system can determine and display the ratings for each application, e.g., count how many applications were rated 1-star, 2-star, etc.

The CategoryPage object is used to form the category hierarchy driving the Directory's dynamic generation of category pages. This object also holds a title for the page along and a list of several applications to display as featured selections on the page.

The Publisher object holds the user id of a user (e.g., source user) responsible for creating and maintaining the application's directory entry along with their editing permissions. Examples of permission levels include:

Edit: grants someone the right to edit the modifiable fields in the DirectoryEntry
Delete: grants the user the right to delete the DirectoryEntry
AddUser: grants the user the right to add additional users with the same or more restrictive rights.

In one aspect, permission ordering from most-to-least is Delete, AddUser, Edit.

The Import object acts as a record of what imports have been initiated of an application into any particular organization. This object holds ids of the DirectoryEntry (or package id), the system administrator importing the application, the organization affiliation of the system administrator, and the date of import. This object allows ranking of applications based on the number of imports and can be used, if desirable, to limit users to commenting and rating only on those applications that have been imported in their own organizations.

The UserReview object holds comments and ratings made by a specified user of a particular application entry. Restrictions may be imposed on who can add comments and rate applications such as only allowing authenticated users or even restricting only to those users in organizations that have imported the application. An implementation need not have any such restriction.

Implementing Categories Using CategoryPage Objects

A useful user requirement on the Directory is to be able to see a list of applications by solution category. Any application may appear in any number of categories and categories are preferably nested. Additionally, to allow other views of the data, such as by business size or market segment, it is desirable to be list applications accord to different categorization schemes.

According to one aspect, categories are assigned as the application of tags (out of a multi-select picklist) to each application entry. A user working on preparing the directory entry for an application is presented with the current categorization scheme in the form of a set of check boxes to indicate which categories apply to the application. The system will assign the necessary picklist values to the application's directory entry.

To make it easy for a directory administrator to manually make entries and run reports showing which applications are in which categories, in one aspect, each application entry contains a category field containing a multi-select picklist of available categories. For readability, picklist values representing a subcategory should show the path to subcategory, i.e., "Consumer+Games" value would imply the application exists in the subcategory Games under the Consumer category. Multiple values place the application into multiple categories.

Figure 5:
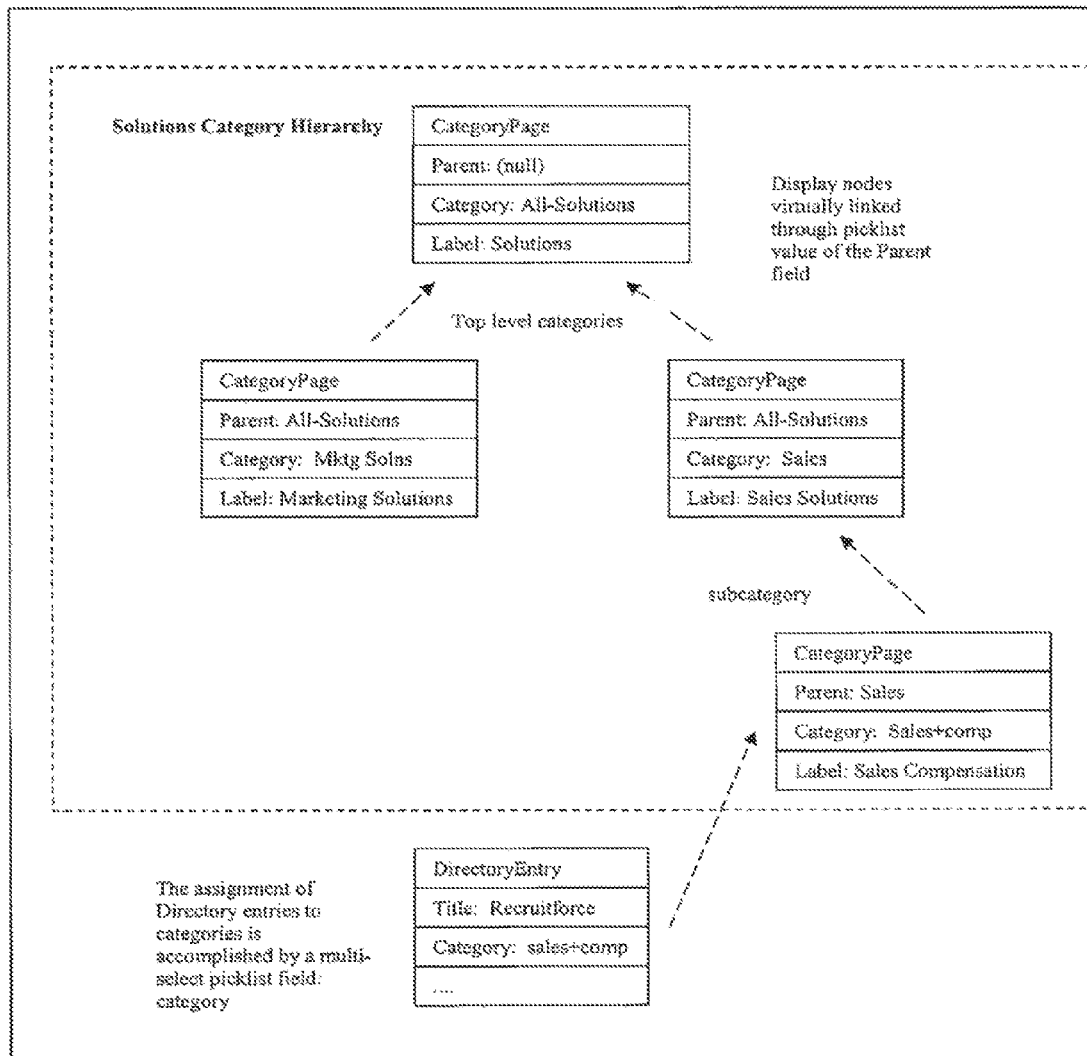
FIG. 5 shows a solutions category hierarchy in an embodiment.

Because categories and their hierarchies are created for the purpose of generating category pages, the hierarchical representation of a particular category hierarchy uses a set of CategoryPage objects. In one aspect, a CategoryPage object exists for each category and/or subcategory available. CategoryPage objects are linked together to form a tree through fields specifying the node's own category and the category of its parent node. Root nodes, are indicated by CategoryPages which have no parent. (See, e.g., FIG. 5). Tree traversal is accomplished by query. For example, to find the labels of top level categories of a particular hierarchy, called All-Solutions, a query might look like:

select Label from CategoryPage_c where ParentNode_c='All-Solutions'.

In one aspect, display nodes also carry additional information used by JSP pages rendering the list of applications falling into the specified category. This additional information includes a field for maintaining a count of associated applications, page title label, page body text, and applications to feature on the page.

In summary, directory supported user functions might include:

For visitors (viewing and importing users):
    View application list filtered and sorted by business area (category), author, date submitted, rating, or other criteria
    View full application description (detail page)

View full application specification/profile (such as #of objects, object names, web integration links (WILs), etc.)
View aggregated user ratings of applications
View "highlighted" applications according to business area or overall
View top ranked applications
View most popular applications
Submit/change their rating of individual applications (optional restriction)
Post comments associated with individual applications (optional restriction)
Try out application in app-specific demonstration organization
Import application to their own organization For developers (export users):
View application packages that the developer developed
Submit application for publication along with associated descriptive information.
Remove applications from the directory
Edit/update application descriptions
Receive email notification when application has been approved by provider review
Delegate responsibility over the management and publication of the application to other users
Upload images, pdfs, and other documents associated with the application as attachments to the DirectoryEntry Miscellaneous In one alternate embodiment, rather than using a new type of organization (e.g., container organization) in the database schema to store an exported package, exported packages are implemented as binary large objects in the database (e.g., Oracle db) or as text or binary data stored in a flat file format. However, upgrade scripts may not work well against flat files. Therefore, in one embodiment, a package is implemented as a separate "hidden" organization within the database system (e.g., salesforce.com service). This advantageously allows release upgrade scripts to upgrade these exported organizations.

In one aspect, storing a foreign key to the unique package id on all setup data included in the package is performed instead of storing a package table including the primary keys of all objects in the package. However, the package table approach is preferred as it makes it more efficient to quickly determine which objects were included in the package at runtime. It may be desirable to determine which objects were included in the package at runtime to differentiate between installed packages from the base system or from each other. For example, in the custom object edit screens, custom objects that were imported as read only cannot be modified while all other custom objects (not imported) can be modified.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer program product, comprising a non-transitory computer usable medium having a computer readable program code embodied therein, the computer readable program code adapted to be executed to implement a method, the method comprising:
creating, by a first user of an on-demand database service, a package definition that references a set of one or more metadata objects that describe an application, wherein the package definition includes:
profile information defining at least one group of users allowed to access the application,
user interface information defining a customization to a user interface; and
a flag, set by the first user, to indicate that customization of the one or more metadata objects is allowed,
distributing the one or more metadata objects for use by users of the on-demand database service:
providing access to the customization to the user interface to the group of users allowed to access the application; and
denying access to the customization to the user interface to other users not included in the group of users allowed to access the application.

2. The computer program product recited in claim 1, further comprising verifying the package definition, wherein the verifying the package definition includes verifying the one or more metadata objects.

3. The computer program product recited in claim 1, wherein the package definition includes a package identifier.

4. The computer program product recited in claim 1, wherein dependencies for the one or more metadata objects are identified and included in the package definition.

5. The computer program product recited in claim 2, wherein the verifying includes checking for missing components.

6. The computer program product recited in claim 1, wherein the package definition is stored in a database.

7. The computer program product recited in claim 2, wherein the verifying is performed in response to a user request.

8. The computer program product recited in claim 1, wherein the package definition is stored in an on-demand database.

9. The computer program product recited in claim a, wherein the verifying includes validating.

10. A method, comprising:
creating, by a first user of an on-demand database service, a package definition that references a set of one or more metadata objects that describe an application, wherein the package definition includes:
profile information defining at least one group of users allowed to access the application,
user interface information defining a customization to a user interface; and
a flag, set by the first user, to indicate that customization of the one or more metadata objects is allowed;
distributing the one or more metadata objects for use by users of the on-demand database service, utilizing a processor;
providing access to the customization to the user interface to the group of users allowed to access the application; and
denying access to the customization to the user interface to other users not included in the group of users allowed to access the application.

11. A system, comprising:
a processor for
creating, by a first user of an on-demand database service, a package definition that references a set of one or more metadata objects that describe an application, wherein the package definition includes:

profile information defining at least one group of users allowed to access the application, user interface information defining a customization to a user interface; and a flag, set by the first user, to indicate that customization of the one or more metadata objects is allowed;

distributing the one or more metadata objects for use by users of the on-demand database service;

providing access to the customization to the user interface to the group of users allowed to access the application; and denying access to the customization to the user interface to other users not included in the group of users allowed to access the application.

12. The computer program product recited in claim 1, wherein the customization to the user interface includes custom tabs for the application.

13. The computer program product recited in claim 1, further comprising:

upgrading the package definition, including making changes to the package definition, by the first user; and providing the changes made to the package definition to the users allowed to access the application.

14. The computer program product recited in claim 1, wherein a second user included in the group of users allowed to access the application uses a wizard to install the package definition, and wherein the wizard allows customization of the installation.

15. The computer program product recited in claim 14, wherein mappings between source specific references and values appropriate for the second user are defined for the package definition.

* * * * *